UNITED STATES PATENT OFFICE.

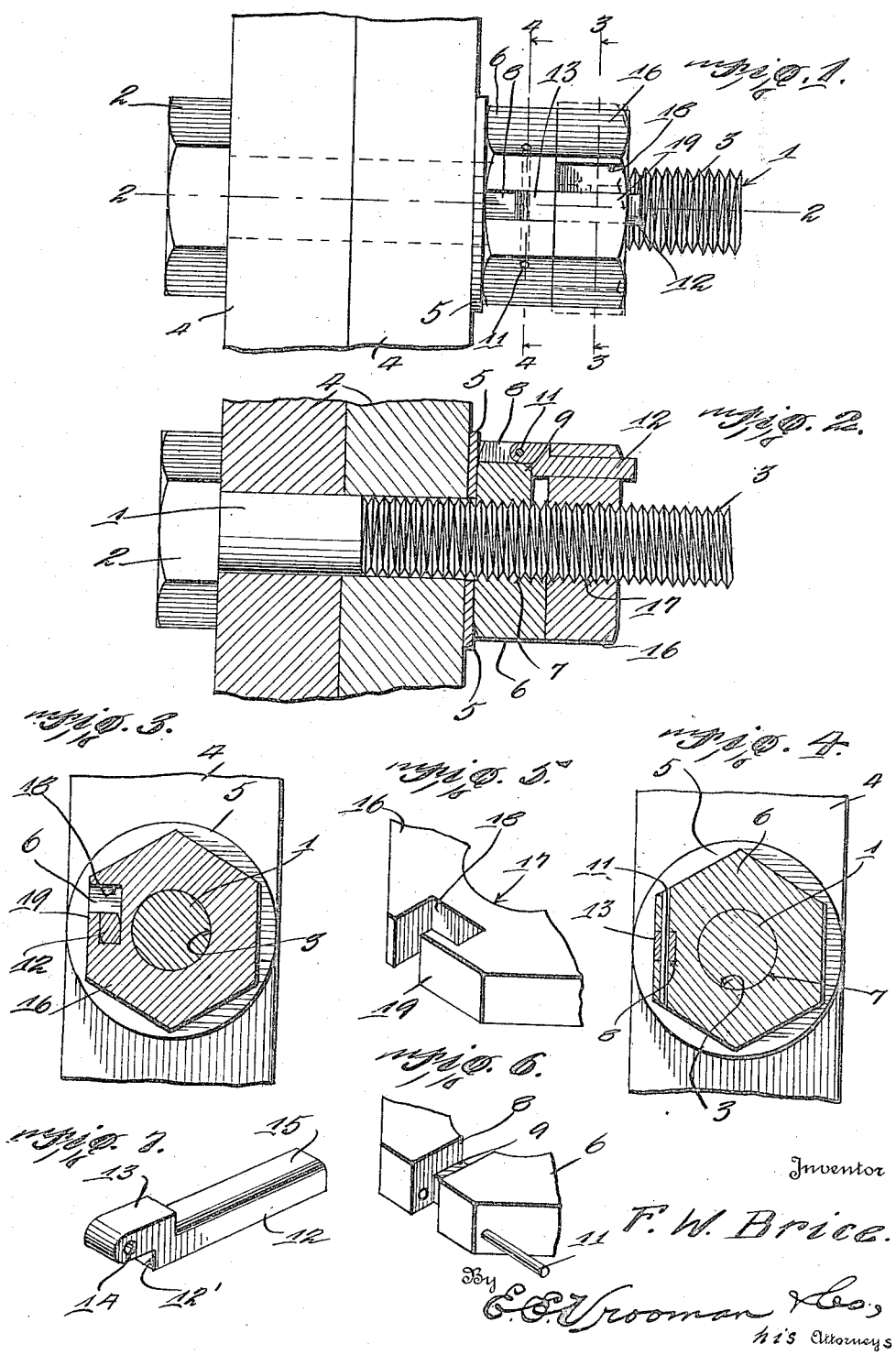

FILLIMORE W. BRICE, OF MER ROUGE, LOUISIANA, ASSIGNOR OF ONE-THIRD TO JAMES M. HOLLINGSWORTH, OF MER ROUGE, LOUISIANA.

NUT-LOCK.

1,222,843.  Specification of Letters Patent.  Patented Apr. 17, 1917.

Application filed May 15, 1916. Serial No. 97,694.

*To all whom it may concern:*

Be it known that I, FILLIMORE W. BRICE, a citizen of the United States of America, residing at Mer Rouge, in the parish of Morehouse and State of Louisiana, have invented certain new and useful Improvements in Nut-Locks, of which the following is a specification, reference being had therein to the accompanying drawing.

This invention relates to a nut lock and has for its principal object the production of a device which is so constructed as to positively retain the nuts in a set position upon the bolt, thereby preventing the accidental displacement when in use of the nuts.

Another object of this invention is the production of a nut lock which is constructed so as to provide a pair of nuts carried upon the bolt, one of the nuts being provided with a pivoted key which is adapted to fit within the notch of the remaining nut for retaining the nuts in engagement with each other upon the bolt.

Another object of this invention is the production of a nut lock which is constructed so as to have the two nuts carried upon a right and left hand threaded bolt so that when the key which is pivotally carried upon one nut is swung into the notch of the remaining nut the two nuts will be retained in a set position upon the bolt.

With these and other objects in view this invention consists of certain novel combinations, constructions, and arrangements of parts as will be hereinafter fully described and claimed.

In the accompanying drawing:

Figure 1 is a top plan view of the nut lock, showing the same when the nuts are locked upon the bolt.

Fig. 2 is a central longitudinal section of the nut lock, taken on the line 2—2 of Fig. 1.

Fig. 3 is a vertical section through one of the nuts, taken on the line 3—3 of Fig. 1, looking in the direction of the arrows.

Fig. 4 is a section taken on the line 4—4 of Fig. 1, looking in the direction of the arrows.

Fig. 5 is a fragmentary detail perspective view of the auxiliary nut, showing the notch formed therein.

Fig. 6 is a fragmentary detail perspective view of the primary nut showing the pocket formed therein.

Fig. 7 is a detail perspective view of the key.

Referring to the accompanying drawing by numerals it will be seen that the bolt 1 having the usual head 2 is provided with the right and left hand threads 3 extending from one end thereof. This bolt 1, may of course, be passed through any supporting structure, as shown at 4, for holding the same together after the nuts have been positioned upon the bolt. If so desired, the washer 5 may be passed over the threads 3 so as to bear against the outer surface of one of the supports, as shown in Figs. 1 to 4 inclusive.

The primary nut 6 is internally threaded as shown at 7 so as to be threaded upon the bolt, the threads 7 of the primary nut being right hand threads. This primary nut 6 is provided with an L-shaped pocket 8 formed therein, thereby forming the abutment bridge 9 extending therethrough. The primary nut is provided with alined apertures 10 so as to permit the pin 11 to be passed through the apertures, thereby permitting the pin to be carried by the primary nut although the pin will also pass through the L-shaped pocket 8.

The key comprises an elongated body 12 having an offset end 13 in which there is formed an opening 14. This offset extension 13 is adapted to fit in the outer portion of the pocket 8 adjacent the periphery of the primary nut 6, whereby the opening 14 formed in the extension 13 will register with the apertures 10 thereby permitting the pivot pin 11 to be passed through the apertures and the opening 14 for pivotally supporting the key. It should be noted, however, that owing to the fact that the end 13 is offset it will be positioned above the outer plane of the body 12 and as a consequence the body 12 will extend over the pocket 8 at a distance nearer the opening 10 formed in the primary nut 6. It should be noted however, that two of the corners of the body 12 which are diagonally disposed with respect to each other are beveled as indicated at 15.

The auxiliary nut 16 is provided with a central threaded opening 17 which is internally threaded having left hand threads. Thus, it will be seen that when this auxiliary nut 16 is positioned upon the bolt it will be necessary to rotate the same in the opposite direction to the primary nut 6, in order to pass these nuts as far as desired upon the threads 3 of the bolt 1. This auxiliary nut 16 is provided with an L-shaped notch 18 extending inwardly from its periphery, whereby the inner portions of the notch 18 are overhung by means of the overhanging lip 19.

When this nut lock is in use the primary nut is first threaded upon the threads 3 of the bolt 1, being turned to the right to a point desired. It is, of course, obvious that the nut may be turned so as to bind upon the supporting structure, such for instance as the side of the fish plate, or upon the washer or may be turned so as to be spaced at a distance from the supporting structure. At this time it will be seen that it will be necessary to swing the key upon the pin 11 away from the outer end of the bolt. After this action the auxiliary nut 16 may be threaded upon the threads 3 of the bolt 1 being turned to the left until the nut is very near to or almost bearing upon the primary nut which has been threaded upon the bolt. At this time it will be necessary for the auxiliary nut to be in such a position as to permit the entrance to the notch 18 to be in direct alinement with the pocket 8 formed in the primary nut 6. At this time the key may be swung over the bolt so as to pass into the entrance of the notch 18 and rest upon the inner portion of the notch. By a slight turn of the auxiliary nut it will be seen that the key will pass under the overhanging lip 19 and as a consequence the key will be held from accidental displacement or swinging out over the notch of the auxiliary nut 16. It should be noted that owing to the fact that the corners 15 are rounded the auxiliary nut may be turned so as to permit the key to be passed into the pocket without any possibility of the corners accidentally binding upon the inner portions of the overhanging lip 19, which action would, of course, prevent the lip from being removed from the notch. In the present construction, however, after the two nuts have been threaded into a binding engagement with each other and the key fits within the notch and under the lip it will be seen that the two nuts will be held in a locked condition upon the threads of the bolt 1 without any danger of accidental displacement. It should be noted that in order to provide the overhanging lip for holding the key against accidental displacement by swinging outwardly it will be necessary to form the inner portions of the notch at a distance from the outer periphery of the auxiliary nut. In order to so construct the key as to allow it to fit within the inner portions of this notch it is necessary to provide the offset extension 13 so that the body may extend nearer to the bolt when the key is in use than the extension, whereby the body may fit within the notch. It will also be noted that the shoulder 12' formed upon the inner end of the body will bear upon the abutment bridge 9 whereby the key will be steadied and thus more firmly carried within the notch when the nut lock is in operation.

From the foregoing description it will be seen that a very efficient lock nut has been constructed wherein the left and right hand threaded nuts after being threaded upon the bolt will be held against rotation by the swinging of the key into the notch, thus preventing the accidental displacement of the nuts when the device is in use.

What is claimed is:

1. In a nut lock of the class described, the combination of a bolt having right and left hand intersecting threads, a primary nut threaded upon said bolt, an auxiliary nut threaded upon said bolt, said nuts being oppositely threaded, said primary nut being provided with a substantially L-shaped pocket formed adjacent its periphery, said pocket having an abutment bridge, said auxiliary nut having a notch extending inwardly from its periphery, said auxiliary nut having a lip overhanging the inner portions of said notch, thereby forming a substantially L-shaped notch, a key comprising an elongated body having beveled corners in diagonal relation, an offset extension formed upon the inner end of said key, whereby the inner end of said body will be provided with an abutment shoulder, said offset extension fitting within the outer portions of said L-shaped pocket of said primary nut, means for pivotally securing said key to said primary nut, said body of said key being adapted to be swung into the notch of said auxiliary nut and then moved under said lip, whereby said key will be held against accidental displacement and said nuts will be held from accidentally rotating, the beveled corners of said body being adapted to permit the movement of said key under said lip.

2. In a nut lock of the class described, the combination of a bolt having oppositely extending threads, a primary nut and an auxiliary nut carried by said bolt, said nuts being oppositely threaded, said auxiliary nut having a notch, said auxiliary nut having a lip overhanging the inner portions of said notch, a key pivotally mounted upon said primary nut, said key being adapted to be swung into said notch and then moved under said lip, whereby said key will be held within said notch, thereby holding said nuts against accidental rotation.

3. In a nut lock of the class described, the combination of a bolt having right and left threads, a primary nut and an auxiliary nut carried by said bolt, said auxiliary nut having a notch formed therein, said auxiliary nut also having a lip overhanging a part of said notch, an elongated key pivotally mounted upon said primary nut, said key having rounded corners, said key being adapted to be swung into said notch, said rounded corners permitting the key to be moved under said lip, whereby said key will be held from accidentally disengaging said auxiliary nut, and said nuts will be held against accidental rotation.

4. In a nut lock of the class described, the combination of a bolt having right and left threads, a primary nut and an auxiliary nut carried by said bolt, said auxiliary nut having a notch formed therein, said auxiliary nut also having a lip overhanging a part of said notch, said primary nut having a pocket formed therein, a key pivotally mounted within said pocket, said key comprising a body having an offset extension, whereby said key may be swung so as to cause said extension to fit within said notch and move under said lip, whereby said key will be held in a set position, and said nuts will be held against accidental displacement.

In testimony whereof I hereunto affix my signature.

FILLIMORE W. BRICE.

Copies of this patent may be obtained for five cents each, by addressing the "Commissioner of Patents, Washington, D. C."